Patented Apr. 15, 1941

2,238,331

UNITED STATES PATENT OFFICE 2,238,331

VULCANIZATION OF RUBBER

Joy G. Lichty, Stow, Ohio, assignor to Wingfoot Corporation, Wilmington, Del., a corporation of Delaware No Drawing. Application May 23, 1936, Serial No. 81,485

13 Claims. (Cl. 260—793)

This invention relates to the vulcanization of rubber. More particularly, it relates to a new class of accelerators for the vulcanization of rubber; namely, the formaldehyde reaction products of dithiocarbamic acids.

The invention has for objects the provision and preparation of a new class of vulcanization accelerators, their use in rubber and rubber vulcanized in their presence. Other objects and advantages will become apparent as the description of the invention proceeds.

Heretofore various dithiocarbamates have been used in the vulcanization of rubber. Among them are the bivalent metallic salts and substituted ammonium salts of dialkyl dithiocarbamic acids and the 2-4-dinitro phenyl esters of dialkyl dithiocarbamic acids. Bruni has also vulcanized rubber in the presence of the formaldehyde reaction products of ammonium salts of dithiocarbamic acids as disclosed in United States Patents Nos. 1,886,636 and 1,892,719.

This invention resides in the discovery that when formaldehyde is reacted with a dithiocarbamic acid, new compositions which are excellent accelerators are obtained. Since dithiocarbamic acids generally exist only in solution and then, only for a short time, the products of the invention are preferably prepared by adding an acidifying agent to a solution or liquid dispersion containing formaldehyde and a dithiocarbamate. The dithiocarbamate should be one which does not react with formaldehyde and which will form the free acid upon acidulation. The metallic salts, particularly the alkali metal and alkali earth metal salts, are quite satisfactory. The zinc and other bivalent metal salts may also be used, however. The reaction is carried out in a liquid medium of which a mutual solvent for the reactants, such as water, alcohol and acetone, is preferred. It has been found desirable to conduct the reaction in the cold—generally below a temperature of about 15° C.—although room and higher temperatures may be used too. A temperature at which the free dithiocarbamic acid will not decompose before its reaction with the formaldehyde is preferable, of course. Such a temperature need not be a low one.

The reacting materials appear to react in molar proportions and such proportions are usually employed in the practice of the invention, although an excess of formaldehyde is often desirable. Although the mechanism of the reaction and the constitution of the final products are not known definitely, it is believed that the acidifying agent first reacts with the dithiocarbamate to release at least momentarily the free dithiocarbamic acid which then reacts with the formaldehyde to form a methylol ester of the dithiocarbamic acid. Consequently, at least a mol of acidifying agent per mol of dithiocarbamate should be used. Also, there should be employed at least one mol of formaldehyde for each dithio carboxy radical present in the dithiocarbamate. It will be understood that the invention is not to be limited by the various theories expressed herein and that it is not known just what happens but that in any event new compositions of matter which are excellent accelerators of rubber vulcanization are formed. In view of the uncertainties of the constitution of the products, they will be referred to herein as reaction products.

Example 1

Further illustrating the practice of the invention is the reaction of formaldehyde with dimethyl dithiocarbamic acid. It may be carried out as follows:

A mixture of 314.4 grams of an aqueous solution containing 0.4 mol of sodium dimethyl dithiocarbamate and 100 grams of 36% formaldehyde was stirred vigorously and maintained at a temperature below 10° C. during the addition of 300 grams of 5% HCl. A liquid separated out and and was removed by means of a separatory funnel. The remaining material was allowed to stand in the open over night and was then dried in a vacuum desiccator over $H_2SO_4$. The resulting amber viscous liquid weighing 29.2 grams possessed a specific gravity at 26° C. of 1.14. Its chemical nature is not known definitely. Formaldehyde may, however, react with dimethyl dithiocarbamic acid according to the following equation:

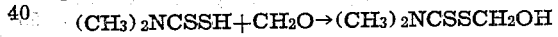

$(CH_3)_2NCSSH + CH_2O \rightarrow (CH_3)_2NCSSCH_2OH$

The analysis of the product approaches the calculated values assuming this formula.

Per cent N found: 7.96, 8.18   Calculated for $C_4H_9ONS_2$, 9.27

Per cent S found: 36.30, 36.10   Calculated for $C_4H_9ONS_2$, 42.5

The analysis is not in particularly close agreement with the calculated values but offers some evidence of the nature of the reaction.

Example 2

The product of dibenzyl dithiocarbamic acid and formaldehyde may be prepared as follows:

One mol of dibenzyl amine was added to 500 cc. of ice water and 44 grams of 90% sodium hydroxide were then added. When the caustic had gone into solution, 80 grams of carbon bisulphide were added in portions. In about fifteen minutes, a homogeneous solution was obtained. To this solution were added 80 grams of 36% formaldehyde solution. A slight change in the depth of the yellow color of the solution was observed. The beaker containing the solution was then equipped with mechanical stirring and the acid was added slowly and in portions. The acid was made up by adding 100 grams of 36% hydrochloric acid to ice and water making up 500 cc. of the dilute acid. When the acid was first added a dark oil separated out. This was removed and the addition of acid was continued. A bulky, white crystalline precipitate was formed. The white crystalline precipitate was filtered off, washed with cold water and dried, leaving a white, crystalline solid. This material was soluble in practically all organic solvents with the exception of gasoline (B. P. 40–140° C.) and petroleum ether. It was found that the material could be recrystallized by dissolving in ether, then adding gasoline or petroleum ether and allowing to evaporate slowly. These crystals melted at 98° C. Further recrystallization gave a product that also melted at 98° C., showing a pure product. It is known that methylene bis dibenzylamine melts according to the literature at 97° C. Accordingly, a quantity of methylene bis dibenzylamine was prepared and a mixed melting point obtained which showed that the two materials were not the same (mixed melting point below 80° C.). A qualitative analysis for sulfur showed that the new product contained sulfur which clearly and conclusively established the non-identity of the two products.

To test whether this material melting at 98° C. was the carbon bisulfide addition product of methylene bis dibenzylamine, some of this material was prepared by dissolving some pure methylene bis dibenzylamine in carbon bisulfide and allowed to stand several days during which the excess solvent was allowed to evaporate slowly. A solid was obtained which was found to be quite soluble in organic solvents. By dissolving in ether and adding twice the volume of petroleum ether, crystals were deposited on cooling. These, however, melted at 73° C. instead of 98° C. A recrystallization gave a product with the same melting point (73°). It is quite clear that the product obtained according to the practice of the present invention is not the addition product of carbon bisulfide and methylene bis dibenzylamine.

Analysis showed this 98° material to contain 5.08% nitrogen and 20.85% sulphur. These figures agree quite closely with the calculated values of 4.62% and 21.12%, obtained by assuming the formula to be

When the sodium salts of ditetrahydro alpha furfuryl dithiocarbamate and di-n-amyl dithiocarbamate were reacted with formaldehyde in the presence of an acid as in the preceding examples, the products obtained were viscous, light yellow oils which resisted efforts to crystallize them. However, these oily products are suitable for incorporation into rubber and function excellently as accelerators.

By procedures similar to the above any other dithiocarbamate may be reacted with formaldehyde. If desired, other salts, such as the zinc, potassium, calcium, etc., dithiocarbamates, may be used in place of the sodium salt. Also, any other dithiocarbamate which does not react with the formaldehyde and which will form the free acid upon acidulation may be employed. In some cases, from the standpoint of solubility, it may be preferable to dissolve the dithiocarbamate in a water miscible solvent such as acetone or alcohol instead of water.

Illustrative of other dithiocarbamates which may be employed in the practice of the invention are those prepared from the dialkyl amines such as methyl ethyl amine, diethyl amine, di-n-propyl amine, di-iso-propyl amine, ethyl isopropyl amine, di-n-butyl amine, di-iso amyl amine, methyl n-propyl amine, methyl isobutyl amine, diheptyl amine and methyl heptyl amine. Others are those prepared from the secondary alicyclic amines such as dicyclohexyl amine, N-ethyl cyclohexyl amine, N-methyl cyclohexyl amine, tetrahydro alpha furfuryl cyclohexyl amine, N-butyl cyclohexyl amine, the di hexahydro o- and p-toluidines, the di(hexahydro o- and p-phenetidyl) amines, the di (hexahydro o- and p-anisyl) amines, etc. Still other dithiocarbamates are those prepared from N-butyl tetrahydro alpha furfuryl amine, di (alpha furfuryl) amine, di(beta phenethyl) amine, sym. dibutyl ethylene diamine, sym. dicyclohexyl ethylene diamine, methyl aniline, ethyl aniline, cyclohexyl aniline, etc. The preferred dithiocarbamates are those prepared from secondary amines containing at least one aliphatic, including cycloaliphatic, radical or a substituted aliphatic radical as is the case in the benzyl, beta phenethyl, tetrahydro furfuryl and furfuryl radicals. Thus, the preferred class includes the dithiocarbamates in which the thiocarbamyl radical contains the amino radical

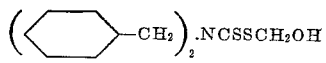

in which R is a radical selected from the group consisting of alkyl, alicyclic, tetrahydrofurfuryl, furfuryl and aralkyl groups and R' is a radical selected from the group consisting of alkyl, alicyclic, tetrahydrofurfuryl, furfuryl, aralkyl and aryl groups. Particularly preferred are the dialkyl dithiocarbamates.

Also, it is not intended that the invention be limited to the hydrochloric acid of the examples. Any other acidulating agent which will serve to liberate the free dithiocarbamic acid from the dithiocarbamate may be used. These other materials may be inorganic such as sulphuric and phosphoric acids, sodium bisulphate, potassium dihydrogen phosphate, etc. or organic such as acetic, formic, and propionic acids. Also, the acidulating agent should be low in oxidizing properties so that there will be little or no tendencies to oxidize the dithiocarbamate to a thiuram disulphide.

It will also be understood that in place of ordinary formaldehyde, formaldehyde polymers and the like which yield formaldehyde during the reaction may be used.

The products of the invention may be employed as accelerators in most rubber formulae. The following is one specific formula in which they have been found by test to yield excellent results.

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

Representative products of the invention were incorporated into rubber in accordance with the above formula. Samples were then cured and tested. The following results were obtained.

| Cure in mins. at ° F. | Max. tens., kgs./cm.² | Ult. elong. in percent | Modulus in kgs./cm.² | |
|---|---|---|---|---|
| | | | 500 percent | 700 percent |
| PRODUCT OF DIMETHYL DITHIOCARBAMIC ACID + FORMALDEHYDE | | | | |
| 10/260 | 214 | 690 | 57 | |
| 15 | 231 | 670 | 72 | |
| 20 | 202 | 630 | 79 | |
| 30 | 231 | 660 | 68 | |
| 40 | 176 | 650 | 59 | |
| PRODUCT OF DIBENZYL DITHIOCARBAMIC ACID + FORMALDEHYDE | | | | |
| 10/260 | 120 | 790 | 18 | 62 |
| 15 | 149 | 760 | 27 | 102 |
| 20 | 175 | 770 | 31 | 114 |
| 30 | 180 | 775 | 32 | 115 |
| 40 | 162 | 780 | 30 | 100 |
| PRODUCT OF DITETRAHYDRO ALPHA FURFURYL DITHIOCARBAMIC ACID + FORMALDEHYDE | | | | |
| 10/260 | 120 | 780 | 21 | 73 |
| 15 | 160 | 730 | 32 | 129 |
| 20 | 190 | 730 | 39 | 154 |
| 30 | 193 | 710 | 45 | 179 |
| 40 | 196 | 710 | 48 | 189 |

These data demonstrate that the products of the invention are powerful accelerators, giving high tensile strengths in a very short cure.

The accelerator compositions and the method of preparing them are described and claimed in copending application Serial No. 379,993, filed February 21, 1941.

Although only the preferred forms of the invention have been described in detail, it will be apparent to those skilled in the art that various modifications may be made therein without departing from the spirit of the invention or the scope of the appended claims in which it is intended to cover all features of patentable novelty inherent in the invention.

What I claim is:

1. The method of treating rubber which comprises vulcanizing it in the presence of a product substantially identical with that obtained by reacting formaldehyde with approximately equivalent proportions of hydrochloric acid and an alkali metal salt of a dithiocarbamic acid, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

2. The method of treating rubber which comprises vulcanizing it in the presence of a product substantially identical with that obtained by reacting formaldehyde with approximately equivalent proportions of hydrochloric acid and an alkali metal salt of a dithiocarbamic acid derived from a secondary amine, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

3. The method of treating rubber which comprises vulcanizing it in the presence of a product substantially identical with that obtained by reacting formaldehyde with approximately equivalent proportions of hydrochloric acid and an alkali metal salt of a dithiocarbamic acid derived from a secondary aliphatic amine, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

4. The method of treating rubber which comprises vulcanizing it in the presence of a product substantially identical with that obtained by reacting formaldehyde with approximately equivalent proportions of hydrochloric acid and an alkali metal salt of a dithiocarbamic acid derived from a diaralkyl amine, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

5. The method of treating rubber which comprises vulcanizing it in the presence of a product substantially identical with that obtained by reacting formaldehyde with approximately equivalent proportions of hydrochloric acid and an alkali metal salt of dimethyl dithiocarbamic acid, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

6. The method of treating rubber which comprises vulcanizing it in the presence of a product substantially identical with that obtained by reacting formaldehyde with approximately equivalent proportions of hydrochloric acid and an alkali metal salt of dibenzyl dithiocarbamic acid, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

7. The method of treating rubber which comprises vulcanizing it in the presence of a product substantially identical with that obtained by reacting formaldehyde with approximately equivalent proportions of hydrochloric acid and an alkali metal salt of ditetrahydroalphafurfuryl dithiocarbamic acid, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

8. The method of treating rubber which comprises vulcanizing it in the presence of a product substantially identical with that obtained by reacting formaldehyde with approximately equivalent proportions of hydrochloric acid and an alkali metal salt of a dithiocarbamic acid derived from an amine having the structural formula

in which R is a radical selected from the group consisting of alkyl, alicyclic, tetrahydrofurfuryl, furfuryl and aralkyl groups and R' is a radical selected from the group consisting of alkyl, alicyclic, tetrahydrofurfuryl, furfuryl, aralkyl and aryl groups, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

9. A rubber product which has been vulcanized in the presence of a product substantially identical with that obtained by reacting formaldehyde with approximately equivalent proportions of hydrochloric acid and an alkali metal salt of a dithiocarbamic acid, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

10. A rubber product which has been vulcanized in the presence of a product substantially identical with that obtained by reacting formaldehyde with approximately equivalent proportions of hydrochloric acid and an alkali metal salt of a dithiocarbamic acid derived from a secondary amine, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

11. A rubber product which has been vulcanized in the presence of a product substantially identical with that obtained by reacting formaldehyde with approximately equivalent proportions of hydrochloric acid and an alkali metal salt of a dithiocarbamic acid derived from a secondary aliphatic amine, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

12. A rubber product which has been vulcanized in the presence of a product substantially identical with that obtained by reacting formaldehyde with approximately equivalent proportions of hydrochloric acid and an alkali metal salt of a dithiocarbamic acid derived from a diaralkyl amine, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

13. A rubber product which has been vulcanized in the presence of a product substantially identical with that obtained by reacting formaldehyde with approximately equivalent proportions of hydrochloric acid and an alkali metal salt of a dithiocarbamic acid derived from an amine having the structural formula

in which R is a radical selected from the group consisting of alkyl, alicyclic, tetrahydrofurfuryl, furfuryl and aralkyl groups and R' is a radical selected from the group consisting of alkyl, alicyclic, tetrahydrofurfuryl, furfuryl, aralkyl and aryl groups, the reaction being carried out at a temperature less than about 15° C., at least one mol of formaldehyde being present for each mol of the dithiocarbamate, the reaction product containing nitrogen and sulfur in the same ratio as that in which they are present in the said dithiocarbamate.

JOY G. LICHTY.